US011940954B2

(12) United States Patent
Jernigan et al.

(10) Patent No.: US 11,940,954 B2
(45) Date of Patent: *Mar. 26, 2024

(54) METHODS FOR ENSURING CORRECTNESS OF FILE SYSTEM ANALYTICS AND DEVICES THEREOF

(71) Applicant: NetApp, Inc., San Jose, CA (US)

(72) Inventors: Richard Jernigan, Sewickley, PA (US); Xin Wang, Sewickley, PA (US); Subramanian Natarajan, Sewickley, PA (US); Richard Chow, Vancouver (CA); Adam Ciapponi, Vancouver (CA); Brad Lisson, Langley (CA); Dave Rose, Vancouver (CA)

(73) Assignee: NETAPP, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/093,894

(22) Filed: Jan. 6, 2023

(65) Prior Publication Data

US 2023/0153271 A1    May 18, 2023

Related U.S. Application Data

(63) Continuation of application No. 17/383,645, filed on Jul. 23, 2021, now Pat. No. 11,561,935.

(60) Provisional application No. 63/211,611, filed on Jun. 17, 2021.

(51) Int. Cl.
*G06F 16/17* (2019.01)
*G06F 16/13* (2019.01)
*G06F 16/14* (2019.01)
*G06F 16/18* (2019.01)

(52) U.S. Cl.
CPC .......... *G06F 16/1734* (2019.01); *G06F 16/13* (2019.01); *G06F 16/14* (2019.01); *G06F 16/18* (2019.01)

(58) Field of Classification Search
CPC ...... G06F 16/1374; G06F 16/18; G06F 16/14; G06F 16/13
USPC ....................... 707/646, 769, 825
See application file for complete search history.

(56) References Cited

U.S. PATENT DOCUMENTS

| 6,173,291 B1 | 1/2001 | Jenevein |
| 7,996,421 B2 | 8/2011 | Brooks et al. |
| 8,909,659 B2 | 12/2014 | Harvey et al. |
| 9,275,148 B1 | 3/2016 | Elassaad |

(Continued)

*Primary Examiner* — Shahid A Alam
(74) *Attorney, Agent, or Firm* — Troutman Pepper Hamilton Sanders LLP (Rochester)

(57) ABSTRACT

Methods, non-transitory machine readable media, and computing devices that ensure correctness of file system analytics are disclosed. With this technology, a first generation number for a volume is incremented in response to a modification of a rule set that defines properties of objects of a file system associated with the volume. A determination is made when a second generation number in a first inode for a first one of the objects matches the first generation number. The first inode is identified based on a traversal of a directory tree associated with the file system. The modified rule set is applied to the properties for the first one of the objects to obtain values, when the second generation number fails to match the first generation number. Analytics data is output after the traversal has completed. The analytics data is generated in response to a query and is based on the values.

20 Claims, 6 Drawing Sheets

(56) References Cited

U.S. PATENT DOCUMENTS

| | | | |
|---|---|---|---|
| 9,690,791 B1 | 6/2017 | Chopra et al. | |
| 11,561,935 B2 | 1/2023 | Jernigan et al. | |
| 2003/0093424 A1* | 5/2003 | Chun | G06F 16/24539 |
| | | | 707/999.007 |
| 2004/0105332 A1 | 6/2004 | Crow et al. | |
| 2004/0105629 A1 | 6/2004 | Cheng et al. | |
| 2005/0216794 A1 | 9/2005 | Yagawa | |
| 2009/0240750 A1 | 9/2009 | Seo | |
| 2009/0271412 A1 | 10/2009 | Lacapra et al. | |
| 2010/0241656 A1 | 9/2010 | Iwasaki et al. | |
| 2012/0254333 A1 | 10/2012 | Chandramouli et al. | |
| 2013/0212136 A1 | 8/2013 | Nishida et al. | |
| 2013/0232174 A1* | 9/2013 | Krajec | G06F 16/9024 |
| | | | 707/798 |
| 2014/0115016 A1 | 4/2014 | Perrin et al. | |
| 2015/0142818 A1* | 5/2015 | Florendo | G06F 16/22 |
| | | | 707/741 |
| 2019/0108225 A1 | 4/2019 | Jayaram et al. | |

* cited by examiner

States

- "S": Spider Finished?
  - Yes: means spider has finished for the current rule gen on this dir.
  - No: means this dir has being visited by Spider job, but not yet finished; Or this dir has being visited by file op or MERGE msg, but Spider job not yet finished.
- "R": Rulegen advanced?
  - Yes: the dir rule gen has been advanced to be the same as the current volume rulegen.
  - No: the dir rule gen has NOT been advanced to be the same as the current volume rulegen.

Actions

- Action (A): Move the FSA accounting (subtract the FSA accounting from the "From" dir, and add the FSA accounting to the "To" dir).
- Action (B): Start a new Spider job on the "target" directory as part of rename.
- Action (C): Advance the "To dir"'s rulegen to the the same as the current volume rulegen.

Action Table

| To Dir          | Target Dir -> | R = No<br>S = No      | R = Yes<br>S = No       | R = No<br>S = Yes       | R = Yes<br>S = Yes      |
|-----------------|---------------|-----------------------|-------------------------|-------------------------|-------------------------|
| R = No<br>S = No   |               | A = No<br>B = No<br>C = No   | A = Yes<br>B = No<br>C = Yes  | A = Yes<br>B = No<br>C = Yes  | A = Yes<br>B = No<br>C = Yes  |
| R = Yes<br>S = No  |               | A = No<br>B = Yes<br>C = No  | A = Yes<br>B = Yes<br>C = No  | A = Yes<br>B = Yes<br>C = No  | A = Yes<br>B = No<br>C = No   |
| R = Yes<br>S = Yes |               | A = No<br>B = Yes<br>C = No  | A = Yes<br>B = Yes<br>C = No  | A = Yes<br>B = Yes<br>C = No  | A = Yes<br>B = No<br>C = No   |

FIG. 6

METHODS FOR ENSURING CORRECTNESS OF FILE SYSTEM ANALYTICS AND DEVICES THEREOF

This application is a continuation of U.S. patent application Ser. No. 17/383,645, filed Jul. 23, 2021, which claims the benefit of U.S. Provisional Patent Application Ser. No. 63/211,611, filed Jun. 17, 2021, each of which is hereby incorporated by reference in its entirety.

FIELD

This technology generally relates to data storage systems and, more specifically, to methods an devices for ensuring correctness of file system analytics in data storage systems.

BACKGROUND

Tree data structures are commonly used by computing devices to maintain data having an associated hierarchical arrangement. In one exemplary deployment, information regarding a file system can be maintained in a branched tree structure, such as a network attached storage (NAS) directory tree with interior or parent nodes corresponding to directories and leaf or child nodes corresponding to file, each of which maintains a collection of properties or values. In a NAS environment, many storage nodes can store portions of a distributed database that each maintain a portion of a distributed directory tree structure associated with the file system. Analytics software can then utilize the directory tree maintained in the distributed database to report on the file system.

For example, a directory tree can be used by administrators to determine which directories in the file system have not been accessed in a prior historical time period (e.g., the last year) in order to identify space that can be reclaimed via migration to an archival storage tier. In another example, administrators can use a directory tree to determine the directories of the file system for which there has been a significant amount of modification in a prior historical time period (e.g., the last week). Any number of different analytics properties can be maintained in the directory tree, the various properties can be altered over time, and the file system analytics software can be turned on or off based on available resources, for example.

However, toggling the file system analytics software, and modifying the rule set that defines the collected analytics properties, results in inaccurate analytics while the system becomes current and the analytics properties propagate across the directory tree. Additionally, simultaneous file and directory operations can introduce inconsistency as to whether changed property values have been considered in the stored analytics data. These and other complications in current file system analytics software results in inefficient maintenance of analytics properties and inaccurate analytics data, which is of no value to the analytics consumer.

BRIEF DESCRIPTION OF THE DRAWINGS

FIG. 6 is an action table illustrating actions to be taken based on whether a spider has finished for a directory being moved and the new parent directory and whether the directory being moved and the new parent directory have been reported.

DETAILED DESCRIPTION

Figure 1:
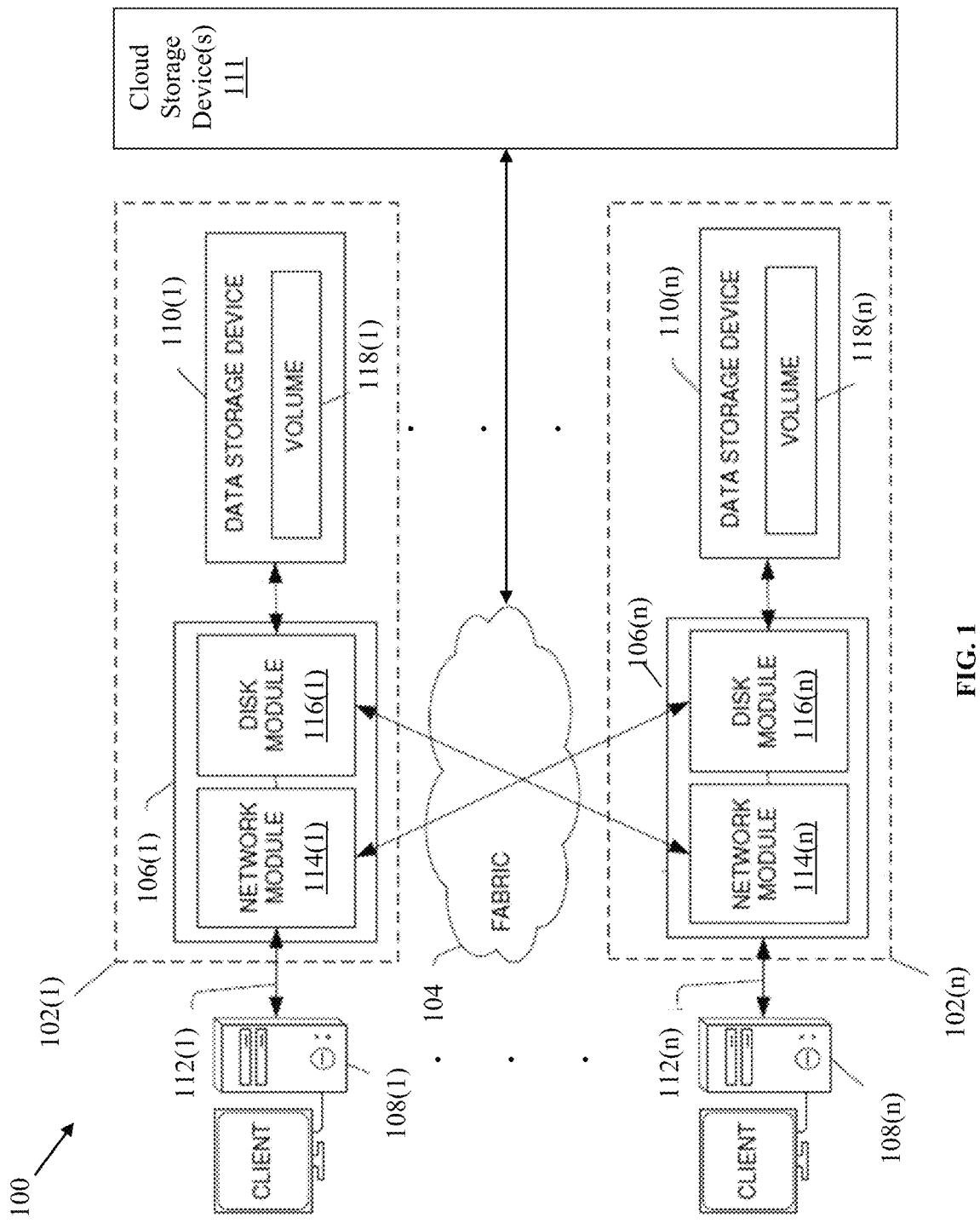
FIG. 1 is a block diagram of a network environment with exemplary data storage apparatuses.

A clustered, distributed network environment 100 that may implement one or more aspects of the technology described and illustrated herein is shown in FIG. 1. The network environment 100 includes data storage apparatuses 102(1)-102(n) that are coupled over a cluster fabric 104 that includes communication network(s) and facilitates communication between the data storage apparatuses 102(1)-102(n) (and one or more modules, components, etc. therein, such as, node computing devices 106(1)-106(n), for example), although any number of other elements or components can also be included in the clustered network environment 100 in other examples.

This technology provides a number of advantages including methods, non-transitory computer readable media, and computing devices that ensure accuracy of file system analytics including across changes to analytics property rules and concurrent file and directory operations. This technology leverages a canonical rule generation number that is associated with each set of analytics rules applicable for a time period in which file system analytics software is toggled on or activated. Accordingly, a rule generation number is set whenever a new set of analytics rules is established (e.g., initially or as a result of a rule set modification), and is applicable for the time period starting when it was set and ending when it is modified. A rule repository maintains the current rule generation number, which is compared to the rule generation number stored with inodes for files and directories to determine whether the analytics property values for those files or directories have been reported within the directory tree analytics database according to the current analytics rule set corresponding to the most recent and current rule generation number.

In the particular example described and illustrated herein with reference to FIG. 1, the node computing devices 106(1)-106(n) can be primary or local storage controllers or secondary or remote storage controllers that provide client devices 108(1)-108(n) with access to data stored within data storage devices 110(1)-110(n) and cloud storage device(s) 111. The data storage apparatuses 102(1)-102(n) and/or node computing devices 106(1)-106(n) of the examples described and illustrated herein are not limited to any particular geographic areas and can be clustered locally and/or remotely via a cloud network, or not clustered in other examples. Thus, in one example the data storage apparatuses 102(1)-102(n) and/or node computing device 106(1)-106(n) are distributed over a plurality of storage systems located in a plurality of geographic locations; while in another example a clustered network can include data storage apparatuses 102(1)-102(n) and/or node computing device 106(1)-106(n) residing in a same geographic location (e.g., in a single on-site rack).

In the illustrated example, one or more of the client devices 108(1)-108(n), which may be, for example, personal computers (PCs), computing devices used for storage (e.g., storage servers), or other computers or peripheral devices, are coupled to the respective data storage apparatuses 102(1)-102(n) by network connections 112(1)-112(n). Network connections 112(1)-112(n) may include a local area network (LAN) or wide area network (WAN) (i.e., a cloud network), for example, that utilize TCP/IP and/or one or more Network Attached Storage (NAS) protocols, such as a Common Internet File system (CIFS) protocol or a Network File system (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 108(1)-108(n) may run applications and may interact with the data storage apparatuses 102(1)-102(n) using a client/server model for exchange of information. That is, the client devices 108(1)-108(n) may request data from the data storage apparatuses 102(1)-102(n) (e.g., data on one of the data storage devices 110(1)-110(n) managed by a network storage controller configured to process I/O commands issued by the client devices 108(1)-108(n)), and the data storage apparatuses 102(1)-102(n) may return results of the requests to the client devices 108(1)-108(n) via the network connections 112(1)-112(n).

The node computing devices 106(1)-106(n) of the data storage apparatuses 102(1)-102(n) can include network or host nodes that are interconnected as a cluster to provide data storage and management services, such as to an enterprise having remote locations and/or cloud storage (e.g., a storage endpoint stored within cloud storage device(s) 111), etc., for example. Such node computing devices 106(1)-106(n) can be attached to the cluster fabric 104 at a connection point, redistribution point, or communication endpoint, for example. One or more of the node computing devices 106(1)-106(n) may be capable of sending, receiving, and/or forwarding information over a network communications channel, and could comprise any type of device that meets any or all of these criteria.

In an example, the node computing devices 106(1) and 106(n) may be configured according to a disaster recovery configuration whereby a surviving node provides switchover access to the storage devices 110(1)-110(n) in the event a disaster occurs at a disaster storage site (e.g., the node computing device 106(1) provides client device 108(n) with switchover data access to storage devices 110(n) in the event a disaster occurs at the second storage site hosting node computing device 106(n)). In other examples, the node computing device 106(n) can be configured according to an archival configuration and/or the node computing devices 106(1)-106(n) can be configured based on another type of replication arrangement (e.g., to facilitate load sharing). Additionally, while two node computing devices are illustrated in FIG. 1, any number of node computing devices or data storage apparatuses can be included in other examples in other types of configurations or arrangements.

As illustrated in the network environment 100, node computing devices 106(1)-106(n) can include various functional components that coordinate to provide a distributed storage architecture. For example, the node computing devices 106(1)-106(n) can include network modules 114(1)-114(n) and disk modules 116(1)-116(n). Network modules 114(1)-114(n) can be configured to allow the node computing devices 106(1)-106(n) (e.g., network storage controllers) to connect with client devices 108(1)-108(n) over the storage network connections 112(1)-112(n), for example, allowing the client devices 108(1)-108(n) to access data stored in the network environment 100.

Further, the network modules 114(1)-114(n) can provide connections with one or more other components through the cluster fabric 104. For example, the network module 114(1) of node computing device 106(1) can access the data storage device 110(n) by sending a request via the cluster fabric 104 through the disk module 116(n) of node computing device 106(n). The cluster fabric 104 can include one or more local and/or wide area computing networks (i.e., cloud networks) embodied as Infiniband, Fibre Channel (FC), or Ethernet networks, for example, although other types of networks supporting other protocols can also be used.

Disk modules 116(1)-116(n) can be configured to connect data storage devices 110(1)-110(n), such as disks or arrays of disks, solid state drives (SSDs), flash memory, or another form of data storage, to the node computing devices 106(1)-106(n). Often, disk modules 116(1)-116(n) communicate with the data storage devices 110(1)-110(n) according to the SAN protocol, such as SCSI or FCP, for example, although other protocols can also be used. Thus, as seen from an operating system on node computing devices 106(1)-106(n), the data storage devices 110(1)-110(n) can appear as locally attached. In this manner, different node computing devices 106(1)-106(n), etc. may access data blocks, files, or objects through the operating system, rather than expressly requesting abstract files.

While the clustered network environment 100 illustrates an equal number of network modules 114(1)-114(n) and disk modules 116(1)-116(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 108(1)-108(n) can be networked with the node computing devices 106(1)-106(n) in the cluster, over the storage connections 112(1)-112(n). As an example, respective client devices 108(1)-108(n) that are networked to a cluster may request services (e.g., exchanging of information in the form of data packets) of node computing devices 106(1)-106(n) in the cluster, and the node computing devices 106(1)-106(n) can return results of the requested services to the client devices 108(1)-108(n). In one example, the client devices 108(1)-108(n) can exchange information with the network modules 114(1)-114(n) residing in the node computing devices 106(1)-106(n) (e.g., network hosts) in the data storage apparatuses 102(1)-102(n).

In one example, the storage apparatuses 102(1)-102(n) host aggregates corresponding to physical local and remote data storage devices, such as local flash or disk storage in the data storage devices 110(1)-110(n), for example. One or more of the data storage devices 110(1)-110(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 118(1)-118(n) in this example, although any number of volumes can be included in the aggregates. The volumes 118(1)-118(n) are virtual data stores or storage objects that define an arrangement of storage and one or more file systems within the clustered network environment 100. Volumes 118(1)-118(n) can span a portion of a disk or other storage device, a collection of disks, or portions of disks, for example, and typically define an overall logical arrangement of data storage. In one example volumes 118(1)-118(n) can include stored user data as one or more files, blocks, or objects that reside in a hierarchical directory structure within the volumes 118(1)-118(n).

Volumes 118(1)-118(n) are typically configured in formats that may be associated with particular storage systems, and respective volume formats typically comprise features that provide functionality to the volumes 118(1)-118(n), such as providing the ability for volumes 118(1)-118(n) to form clusters, among other functionality. Optionally, one or more of the volumes 118(1)-118(n) can be in composite aggregates and can extend between one or more of the data storage devices 110(1)-110(n) and one or more of the cloud storage device(s) 136 to provide tiered storage, for example, and other arrangements can also be used in other examples.

In one example, to facilitate access to data stored on the disks or other structures of the data storage devices 110(1)-110(n), a file system may be implemented that logically organizes the information as a hierarchical (e.g., tree) structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 110(1)-110(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as a data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 110(1)-110(n) can have one or more physical ports, wherein each physical port can be assigned a target address (e.g., SCSI target address). To represent respective volumes, a target address on the data storage devices 110(1)-110(n) can be used to identify one or more of the LUNs. Thus, for example, when one of the node computing devices 106(1)-106(n) connects to a volume, a connection between the one of the node computing devices 106(1)-106(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 2:
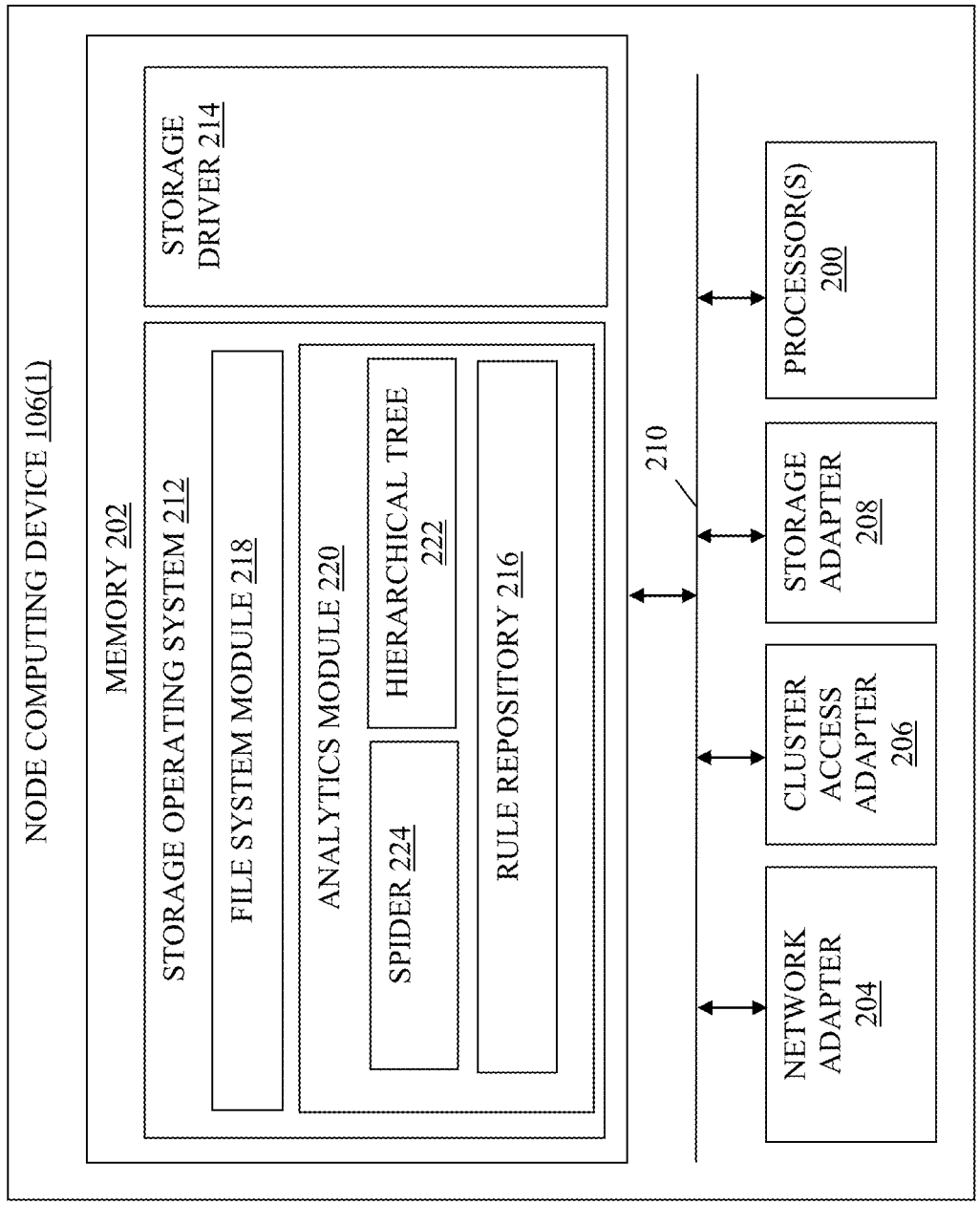
FIG. 2 is a block diagram of an exemplary node computing device of one of the data storage apparatuses of FIG. 1.

Referring to FIG. 2, node computing device 106(1) in this particular example includes processor(s) 200, a memory 202, a network adapter 204, a cluster access adapter 206, and a storage adapter 208 interconnected by a system bus 210. The node computing device 106(1) also includes a storage operating system 212 installed in the memory 202 that can, for example, implement a RAID data loss protection and recovery scheme to optimize reconstruction of data of a failed disk or drive in an array. In some examples, the node computing device 106(n) is substantially the same in structure and/or operation as node computing device 106(1), although the node computing device 106(n) can also include a different structure and/or operation in one or more aspects than the node computing device 106(1).

The network adapter 204 in this example includes the mechanical, electrical and signaling circuitry needed to connect the node computing device 106(1) to one or more of the client devices 108(1)-108(n) over network connections 112(1)-112(n), which may comprise, among other things, a point-to-point connection or a shared medium, such as a LAN. In some examples, the network adapter 204 further communicates (e.g., using TCP/IP) via the cluster fabric 104 and/or another network (e.g. a WAN) (not shown) with cloud storage device(s) 111 to process storage operations associated with data stored thereon.

The storage adapter 208 cooperates with the storage operating system 212 executing on the node computing device 106(1) to access information requested by one of the client devices 108(1)-108(n) (e.g., to access data on a data storage device 110(1)-110(n) managed by a network storage controller). The information may be stored on any type of attached array of writeable media such as magnetic disk drives, flash memory, and/or any other similar media adapted to store information.

In the exemplary data storage devices 110(1)-110(n), information can be stored in data blocks on disks. The storage adapter 208 can include I/O interface circuitry that couples to the disks over an I/O interconnect arrangement, such as a SAN protocol. The information is retrieved by the storage adapter 208 and, if necessary, processed by the processor(s) 200 (or the storage adapter 208 itself) prior to being forwarded over the system bus 210 to the network adapter 204 (and/or the cluster access adapter 206 if sending to another node computing device in the cluster) where the information is formatted into a data packet and returned to a requesting one of the client devices 108(1)-108(n) and/or sent to another node computing device attached via the cluster fabric 104. In some examples, a storage driver 214 in the memory 202 interfaces with the storage adapter 208 to facilitate interactions with the data storage devices 110(1)-110(n).

The storage operating system 212 can also manage communications for the node computing device 106(1) among other devices that may be in a clustered network, such as attached to the cluster fabric 104. Thus, the node computing device 106(1) can respond to client device requests to manage data on one of the data storage devices 110(1)-110(n) or cloud storage device(s) 111 (e.g., or additional clustered devices) in accordance with the client device requests.

The file system module 218 of the storage operating system 212 can establish and manage one or more file systems including software code and data structures that implement a persistent hierarchical namespace of files and directories, for example. As an example, when a new data storage device (not shown) is added to a clustered network system, the file system module 218 is informed where, in an existing directory tree, new files associated with the new data storage device are to be stored. This is often referred to as "mounting" a file system.

In the example node computing device 106(1), memory 202 can include storage locations that are addressable by the processor(s) 200 and adapters 204, 206, and 208 for storing related software application code and data structures. The processor(s) 200 and adapters 204, 206, and 208 may, for example, include processing elements and/or logic circuitry configured to execute the software code and manipulate the data structures.

The storage operating system 212, portions of which are typically resident in the memory 202 and executed by the processor(s) 200, invokes storage operations in support of a file service implemented by the node computing device 106(1). Other processing and memory mechanisms, including various computer readable media, may be used for storing and/or executing application instructions pertaining to the techniques described and illustrated herein. For example, the storage operating system 212 can also utilize one or more control files (not shown) to aid in the provisioning of virtual machines.

In this particular example, the memory 202 also includes an analytics module 220 that maintains a hierarchical tree 222, a spider 224, and a rule repository 216. The hierarchical tree 222 can be an indexed persistent store or an in-memory structure (e.g., a red/black tree or a hash table) that while stored in the memory 202 in this particular example, could be stored in a storage module or elsewhere within the node computing device 106(1), and other types of storage structures can also be used depending on application requirements. The analytics module 220 continuously maintains information regarding the file system managed by the file system module 218 and hosted by the data storage devices 110(1)-110(n) and/or cloud storage device(s) 111.

In one particular example the hierarchical tree 222 is a directory tree maintaining recursive properties of files in the file system in which interior nodes correspond to directories of the file system and leaf nodes correspond to files of the file system that are maintained in the directories. The recursive properties include access and modification information for files and/or metadata associated with the files some examples, although other types of information including creation information can also be used. In this example, parent interior nodes maintain information (e.g., total file size accessed or modified at particular historical time periods) for child interior nodes and associated directories and/or leaf nodes and associated files. The hierarchical tree 222 maintains the recursive properties for each directory and at each of the interior nodes, which can be recursively walked or scanned by the spider 224 in order to generate analytics values according to properties defined in the rule repository 216 for a current rule generation number.

Accordingly, the rule repository maintains rule generation numbers that are each associated with a set of rules that defined the properties for which analytics values are maintained, stored, propagated throughout the hierarchical tree 222, and provided in response to analytics queries from administrators. When a rule generation number is increased (e.g., monotonically), the spider 224 scans the hierarchical tree 222 in a recursive manner to apply the rules in the rule set associated with the current rule generation number and facilitate propagation of the resulting analytics property values up the hierarchical tree 222, as described and illustrated in more detail below with reference to FIG. 3. The analytics module 220 also manages concurrent file and directory operations to ensure accuracy of the analytics property values maintains in the hierarchical tree 222, as described and illustrated in more detail below with reference to FIGS. 4-6.

The examples of the technology described and illustrated herein may be embodied as one or more non-transitory computer or machine readable media (e.g., memory 202), having machine or processor-executable instructions stored thereon for one or more aspects of the present technology, which when executed by processor(s) (e.g., processor(s) 200), cause the processor(s) to carry out the steps necessary to implement the methods of this technology, as described and illustrated by way of the examples herein. In some examples, the executable instructions are configured to perform one or more steps of a method, such as one or more of the exemplary methods described and illustrated below with reference to FIGS. 3-6, for example.

Figure 3:
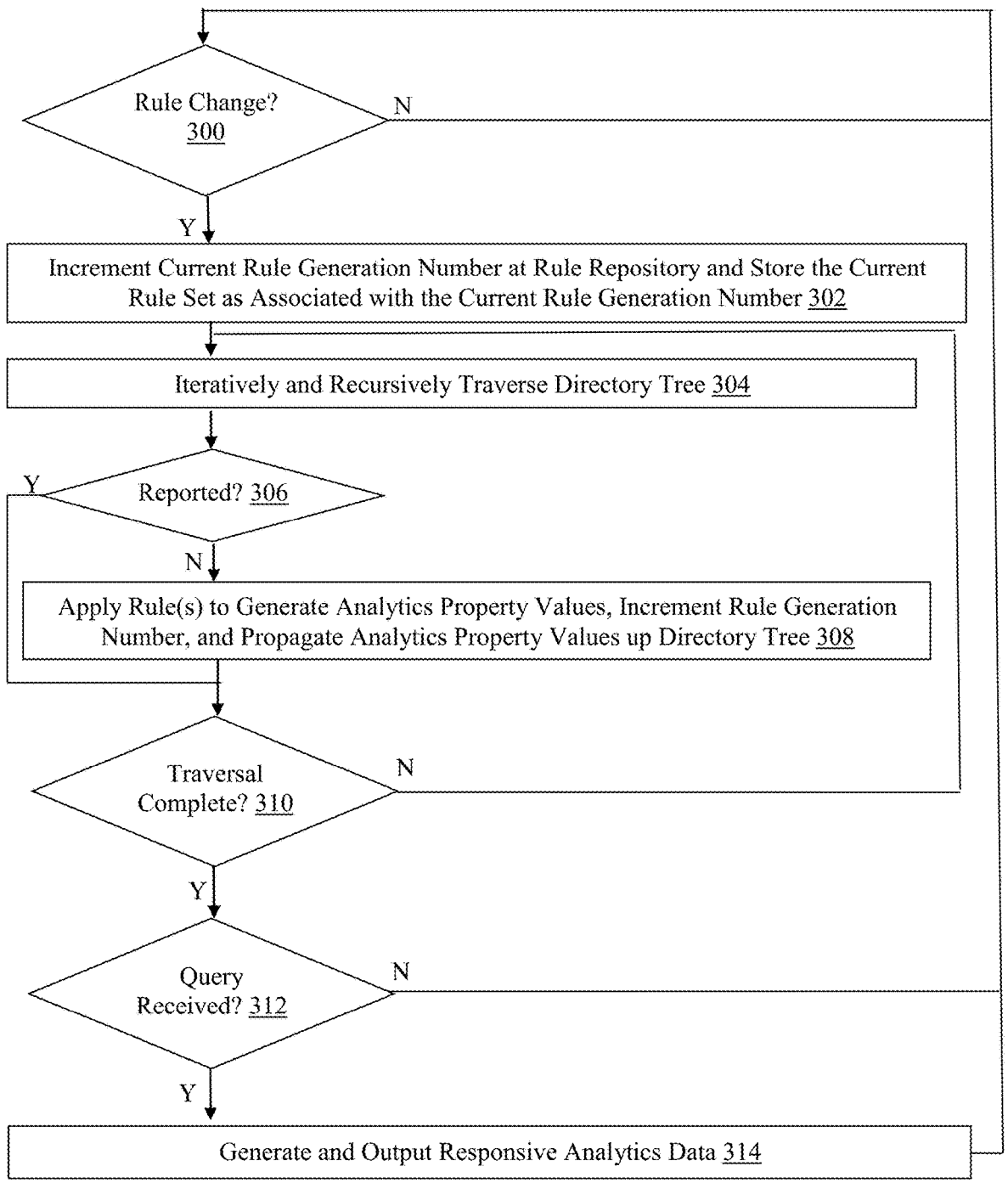
FIG. 3 is a flowchart of an exemplary method for managing analytics rule changes to ensure correctness of analytics property values maintained in a hierarchical tree.

Referring more specifically to FIG. 3, a flowchart of an exemplary method for managing analytics rule changes to ensure correctness of analytics property values maintained in the hierarchical tree 222 is illustrated. In step 300 in this example, the node computing device 106(1) determines whether an analytics rule change is received from an administrator. The rule change can be to turn the analytics module on or to add or remove or otherwise modify one or more analytics rules in the current set of analytics rules.

The analytics rules can relate to the type of properties maintained for files and directors, such as the file size, number of files, number of files having a particular file extension, or any other property of a file or directory. If the node computing device 106(1) determines that a rule change has not been received, then the No branch is taken back to step 300 in this example, and the node computing device 106(1) effectively waits for a rule change to occur. However, if the node computing device 106(1) determines that a rule change has been received, then the Yes branch is taken to step 302.

In step 302, the node computing device 106(1) increments the current rule generation number at the rule repository 216 and stores the current rule set as associated with the current rule generation number. While monotonically increasing rule generation numbers are used in the examples described and illustrated herein, any other indicia can also be used in other examples. In some examples, the current rule generation number maintained in the rule repository reflects the rule generation number for a volume in which the file system is maintained, although other type of organizations can also be used. If the analytics module 220 was merely toggled on, then the rule set may be the same as that associated with the prior rule generation number and, otherwise, the stored rule set with reflect the removal or addition of at least one analytics rule.

In step 304, the node computing device 106(1) iteratively and recursively traverses the hierarchical tree 222 using the spider 224 to apply the stored rule set and propagate the analytics property values. Accordingly, the spider 224 iterates unreported directories (i.e., those directories it encounters that have an associated rule generation number that is out-of-date) and recursively descends to collect the appropriate analytics property values from inodes of the associated files and subdirectories. In this particular examples, if a spider 224 is currently operating when a rule change occurs, the current spider is terminated and a new spider is initiated, although in other examples, spiders associated with different rule generations can execute concurrently.

In step 306, the node computing device 106(1) determines whether one of the files or directories encountered by the spider 224 has been reported or is currently unreported. To determine the report status of the encountered file or directory, the node computing device 106(1) retrieves the rule generation number stored in the inode for the file or directory and compares the retrieved rule generation number to the current rule generation number stored in the rule repository 216. If the comparison indicates that the retrieved rule generation number is out-of-date, then the associated file or directory is unreported.

While the spider 224 is configured to recursively walk the hierarchical tree 222, the generation number allows the node computing device 106(1) to avoid double-counting analytics properties because of an intervening file operation or movement of a previously-reported directory to another location in the file system that has not yet been traversed by the spider 224, among other advantages. Accordingly, if the node computing device 106(1) determines that the file or directory is not reported in the current iteration, then the No branch is taken to step 308.

In step 308, the node computing device 106(1) applies the analytics rule set stored in the rule repository 216 as associated with the current rule generation number. The node computing device 106(1) also increments or replaces the rule generation number in the inode for the file or directory based on the current rule generation number in the rule repository 216. Additionally, the node computing device 106(1) propagates the analytics property values of the hierarchical tree 222.

Accordingly, when the spider 224 encounters a file that is unreported, it reports the file by producing a delta record for its parent directory that reflects the full usage and other properties of the inode corresponding to the file. The delta record indicates the value to be added or subtracted, for example, from the current value for the corresponding analytics property for the parent directory. The delta records can be generated and processed, and the analytics property values can be propagated as described and illustrated in U.S. patent application Ser. No. 17/217,333, filed Mar. 30, 2021, and entitled "METHODS FOR HIERARCHICAL PROPAGATION IN TREE STRUCTURES AND DEVICES THEREOF," which is incorporated herein by reference in its entirety, although other methods of propagating the recursive analytics property values can also be used in other examples.

When the spider 224 encounters a directory that is unreported, it will iterate the directory and recursively descend. The directory can be reported at the start of the iteration, at the end of the iteration while the processing of inbound delta records for the unreported parent directory is stalled until such time, or at the start of the iteration while the directory is marked as being in progress (e.g., with a flag or other indicia in the corresponding inode or other metadata) such that the marking is removed at the end of the iteration. In examples in which directories are marked, the spider 224 is configured not to skip an encountered directory that is marked as in progress, but to instead descend into it normally.

Referring back to step 306, if the node computing device 106(1) determines that the file or directory has been reported, then the Yes branch is taken to step 310. Accordingly, the spider 224 is configured to effectively skip files or directories that are determined to be reported, with the exception of directories marked as in progress in examples in which such a marking is used.

In step 308, the node computing device 106(1) determines whether traversal of the hierarchical tree 222 is complete following the current iteration. If the node computing device 106(1) determines that the traversal is not complete, then the No branch is taken back to step 304, and the spider 224 continues to iterative through the hierarchical tree 222. However, if the node computing device 106(1) determines in step 310 that the traversal is completed, then the Yes branch is taken to step 312.

In step 310, the node computing device 106(1) determines whether an analytics query has been received during the traversal of the hierarchical tree 222 by the spider 224. In this particular example, any received analytics query is stalled until traversal of the hierarchical tree 222 is completed, which ensures the accuracy of the provided analytics data. In other examples, the node computing device 106(1) can analyze the query parameters to determine whether the associated properties have not changed between the current and immediately prior rule sets, indicating that the associated analytics data is accurate even if the traversal is not complete. Other types of analysis of the query can also be performed in other examples.

If the node computing device 106(1) determines that an analytics query has not been received, then the No branch is taken back to step 300, and the node computing device 106(1) again waits for a rule change while processing file and directory operations. However, if the node computing device 106(1) determines in step 312 that an analytics query has been received, then the Yes branch is taken to step 314.

In step 314, the node computing device 106(1) generates and outputs analytics data that is responsive to the analytics query received in step 312. In addition to the completion of the traversal, the node computing device 106(1) can ensure that all pending delta messages are processed such that all analytics property values are propagated up the hierarchical tree 222 in near real-time with respect to the analytics query. In one example, file system analytics data can be generated and output as described and illustrated in U.S. patent application Ser. No. 17/217,485, filed Mar. 30, 2021, and entitled "METHODS FOR FACILITATING EFFICIENT ANALYSIS OF TIME-BASED FILE SYSTEM PROPERTIES USING HISTOGRAMS AND DEVICES THEREOF," which is incorporated herein by reference in its entirety. Subsequent to generating and outputting the responsive analytics data, the node computing device 106(1) proceeds back to step 300 in this example.

Figure 4:
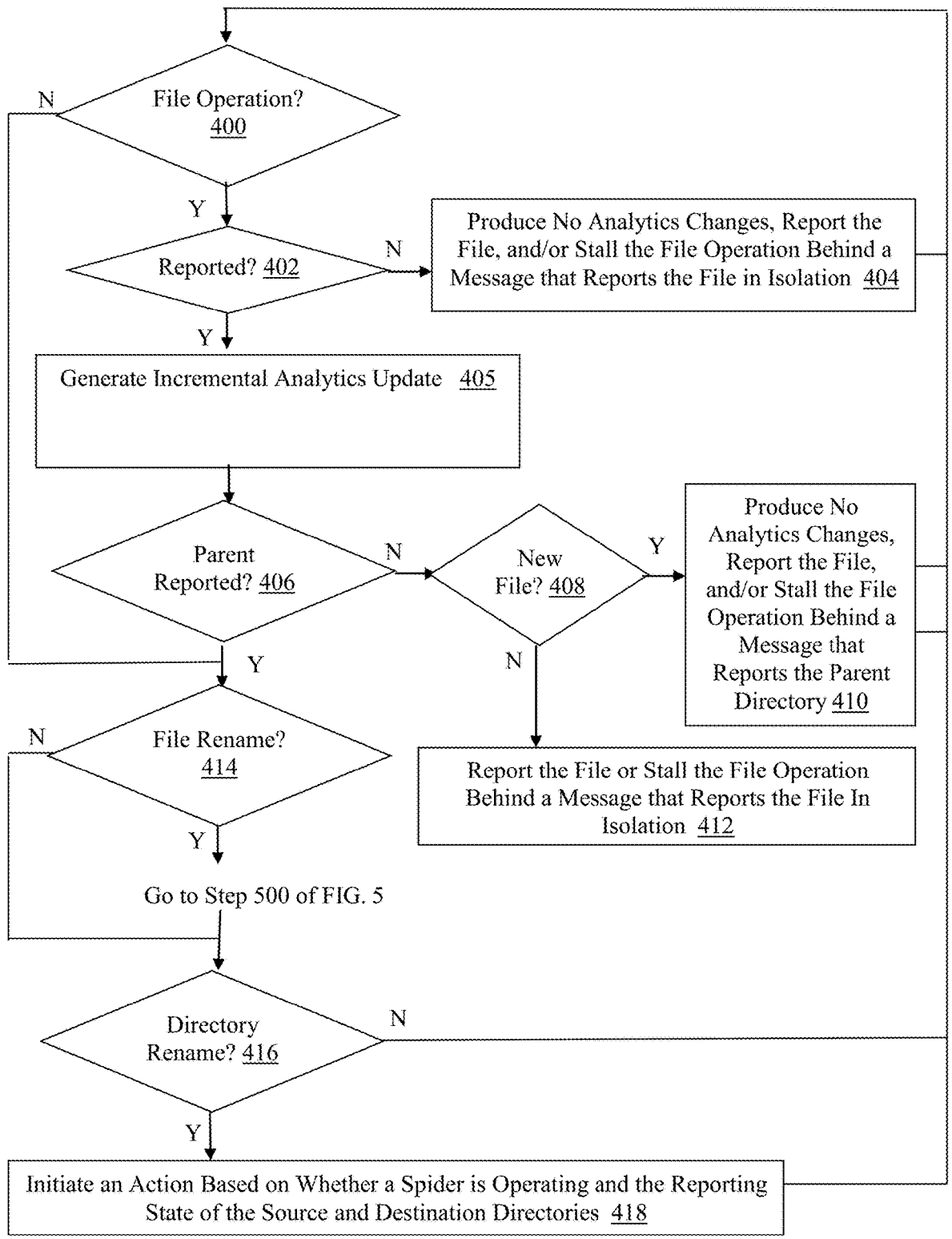
FIG. 4 is a flowchart of an exemplary method for processing concurrent file and directory operations to ensure correctness of analytics property values maintained in a hierarchical tree.

Referring to FIG. 4, a flowchart of an exemplary method for processing concurrent file and directory operations to ensure correctness of analytics property values maintained in the hierarchical tree 222 is illustrated. In step 400 in this example, the node computing device 106(1) determines whether a file operation has been received, such as from one of the client devices 108(1)-108(n). The file operation can be a write or any other operation that modifies one or more attributes of a file with the exception of its name or storage location. If the node computing device 106(1) determines that a file operation has been received, then the Yes branch is taken to step 402.

In step 402, the node computing device 106(1) determines whether the inode associated with the file corresponding to the file operation indicates that the file has been reported with respect to its associated analytics property values. The determination in step 402 can be based on a comparison of an inode rule generation number stored in the inode to the current volume rule generation number maintained in the rule repository 216. If the node computing device 106(1) determines that the file has not been reported (i.e., the inode rule generation number is out-of-date as compared to the current volume rule generation number), then the No branch is taken to step 404.

In step 404, the node computing device 106(1) can take one of several actions. In one example, the node computing device 106(1) can produce no analytics changes. Since the inode rule generation number is behind the volume rule generation number, the spider 224 is actively crawling the hierarchical tree 222 but has not encountered the particular inode yet. Since the spider 224 will eventually reach the inode, the analytics property values associated with the file will be reported without taking any action in-line with respect to the file operation.

However, the node computing device 106(1) can also report the file, such as by generating a delta record for the parent directory that summarizes the final inode state. The final inode state in this example include the analytics property values responsive to the rule(s) in the rule set associated with the current volume rule generation number in the rule repository 214. In another example, the file operation is stalled behind a file system message that reports the file in isolation and marks the parent directory as being in progress. However, if the node computing device 106(1) determines in step 402 that the file has been reported, then the Yes branch is taken to step 405. In examples in which the file is reported, the inode rule generation number for the file is incremented to match the current volume rule generation number.

In step 405, the node computing device 106(1) initiates a process to incrementally updates the analytics report for the file. For example, if the file has grown by 1 MB because of the file operation received in step 400, and if the current rules indicate that file usage is part of the analytics reporting, then the analytics data for this file is updated to reflect the increased usage.

In step 406, the node computing device 106(1) determines whether the parent directory has also been reported based on a comparison of the inode rule generation number in the inode for the directory to the current volume rule generation number in the rule repository 214. If the node computing device 106(1) determines that the parent directory has not been reported, then the No branch is taken to step 408.

In step 408, the node computing device 106(1) determines whether the file operation requires the creation of a new file within the parent directory. If the node computing device 106(1) determines that the file operation requires the creation of a new file, then the Yes branch is taken to step 410.

In step 410, the node computing device 106(1) can take one of several actions. In one example, the node computing device 106(1) can produce no analytics changes. Since the inode rule generation number for the parent directory is behind the volume rule generation number, the spider 224 is actively crawling the hierarchical tree 222 but has not encountered the particular inode yet. Since the spider 224 will eventually reach the inode, the analytics property values associated with the parent directory will be reported without taking any action in-line with respect to the file operation.

However, the node computing device 106(1) can also report the parent directory, such as by generating a delta record for the grandparent directory. In another example, the file operation is stalled behind a file system message that reports the parent directory in isolation via a delta record. In examples in which the file is reported, the inode rule generation number for the file is incremented to match the current volume rule generation number. However, if the node computing device 106(1) determines in step 408 that the file operation does not require the creation of a new file, then the No branch is taken to step 412.

In step 412, the node computing device 106(1) can take one of two action, neither of which is not to produce any analytics changes. Accordingly, the first optional action is that the node computing device 106(1) can report the file by creating a delta record for the parent directory and the second optional action is that the node computing device 106(1) can stall the file operation behind a file system message that reports the file in isolation, as described in more detail above.

While the example described and illustrated with reference to steps 400-412 contemplates a file operation, the operation can also be a directory operation with the node computing device 106(1) determining whether a directory operation has been received in step 400 and whether a new subdirectory is created by the operation in step 408. If the node computing device 106(1) determines in step 400 that a file operation has not been received and the No branch is taken, or in step 406 that the parent directory has been reported and the Yes branch is taken, then the node computing device 106(1) proceeds to step 414. Accordingly, if the parent directly has been reported, then the node computing device 106(1) will generate a delta record for the parent directory as in the normal operation of the file system, such as when the spider 224 has completed its operation and a rule change has not yet been initiated.

Figure 5:
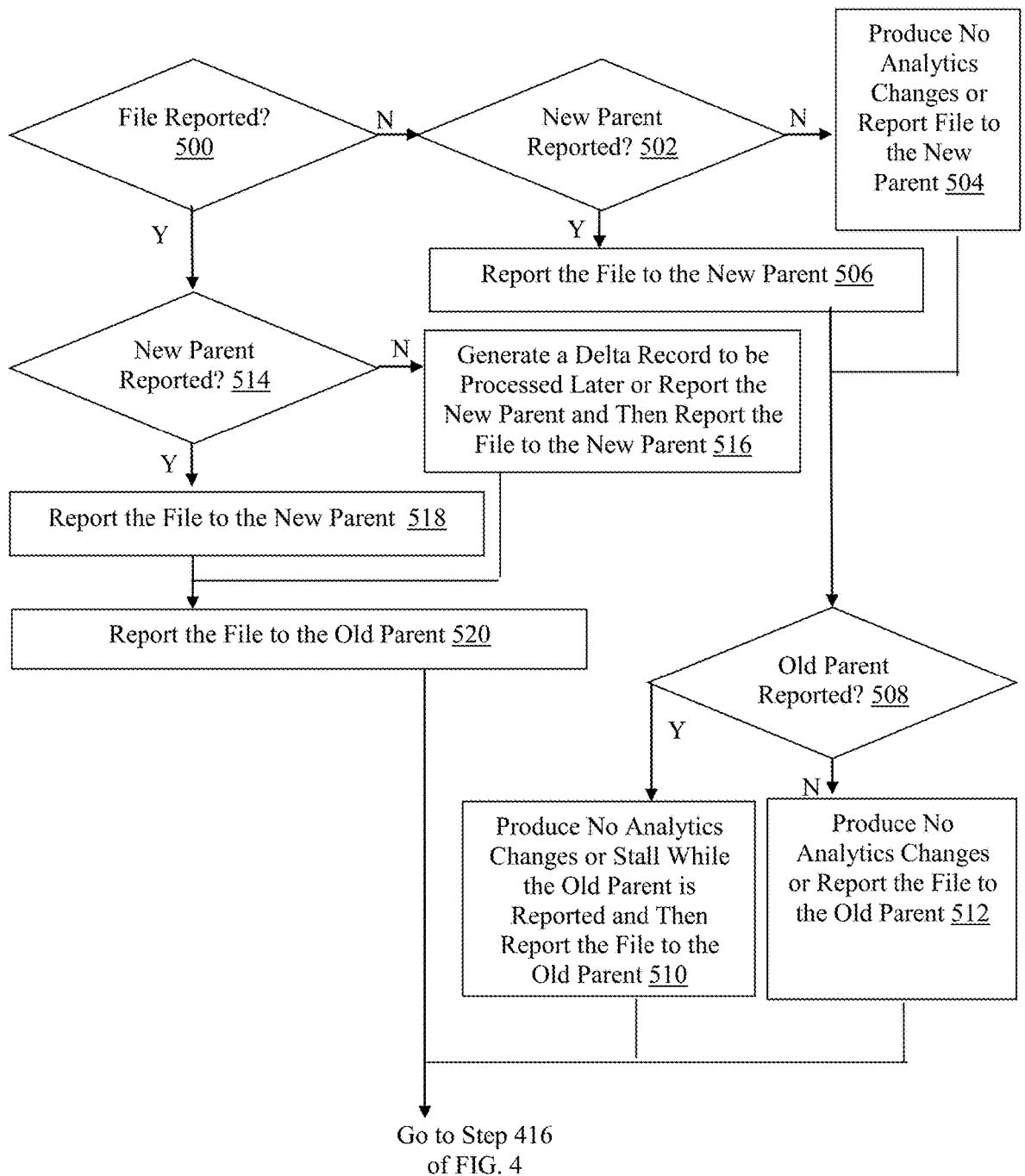
FIG. 5 is a flowchart of an exemplary method for processing concurrent file rename operations to ensure correctness of analytics property values maintained in a hierarchical tree.

In step 414, the node computing device 106(1) determines whether a file rename has been received that replaces the parent directory for the file or moves the file into a new directory. If a file rename is received, then the node computing device 106(1) proceeds to step 500 of FIG. 5. In FIG. 5, a flowchart of an exemplary method for processing concurrent file rename operations to ensure correctness of analytics property values maintained in the hierarchical tree 222 is illustrated. In step 500, the node computing device 106(1) determines whether the file has been reported to the old or source parent directory. If the node computing device 106(1) determines that the file has not been reported, then the No branch is taken to step 502.

In step 502, the node computing device 106(1) determines whether the new or destination parent directory has been reported. If the node computing device 106(1) determines that the new parent has not been reported, then the No branch is taken to step 504.

In step 504, the node computing device 106(1) produces no analytics changes or optionally reports the file to the new parent. In other words, the analytics work can be performed in-line or by the spider 224 when the file is eventually encountered. However, if the node computing device 106(1) determines that the new parent has been reported, then the Yes branch is taken from step 502 to step 506.

In step 506, the node computing device 106(1) reports the file to the new parent via a delta record generated for the new parent.

In step 508, the node computing device 106(1) determines whether the old parent has been reported. If the node computing device 106(1) determines that the old parent has been reported, then the Yes branch is taken to step 512.

In step 510, the node computing device 106(1) produces no analytics changes or stalls while the old parent is reported and then reports the file to the old parent via a delta record indicating negative values for the various analytics properties. However, if the node computing device 106(1) determines that the old parent has not been reported, then the No branch is taken from step 508 to step 512.

In step 512, the node computing device 106(1) produces no analytics changes or reports the file to the old parent. Referring back to step 500, if the node computing device 106(1) determines that the file associated with the rename operation has been reported, then the Yes branch is taken to step 514.

In step 514, the node computing device 106(1) determines whether the new parent has been reported. If the node computing device 106(1) determines that the new parent has not been reported, then the No branch is taken to step 516.

In step 516, the node computing device 106(1) generates a delta record to be processed later (e.g., after the new parent is encountered by the spider 224) or reports the new parent and then reports the file to the new parent. By reporting the new parent first, the spider 224 will skip the new parent when the new parent is encountered. However, if the node computing device 106(1) determines in step 514 that the new parent has been reported, then the Yes branch is taken to step 518.

In step 518, the node computing device 106(1) reports the file to the new parent via a delta record. Subsequent to reporting the file to the new parent, or generating the delta record or reporting the new parent and then reporting the file in step 516, the node computing device 106(1) proceeds to step 520.

In step 520, the node computing device 106(1) reports the file to the old parent via a negative delta record reflecting the loss of the file and its associated usage or other analytics property values. The file is reported to the old parent irrespective of whether the old parent has been reported because there must be a delta record outstanding to charge the file against the old parent, which needs to now be offset. Subsequent to steps 520, 510, and 512, the node computing device 106(1) proceeds back to step 416 or FIG. 4.

In step 416, the node computing device 106(1) determines whether a directory rename is received that requires movement of a directory from an old parent directory to a new parent directory. If the node computing device 106(1) determines that a directory rename has been received, then the Yes branch is taken to step 418.

In step 418, the node computing device 106(1) initiates an action based on whether the spider 224 is operating and the reporting state of the source or old and destination or new directories. Referring to FIG. 6, an action table is illustrated that includes the actions to be taken based on whether the spider 224 has finished for the directory being moved (i.e., the target directory) and the new parent directory (i.e., the to directory) and whether the directory being moved and the new parent directory have been reported (i.e., the rule generation number in the respective inodes have advanced). Referring back to FIG. 4, subsequent to initiating an action in step 418, or if the node computing device 106(1) determines that a directory rename has not been received in step 416 and the No branch is taken, then the node computing device 106(1) proceeds back to step 400 and effectively waits for a file operation, file rename, or directory rename to be received, although one or more of those types of operations can be processed in parallel.

With this technology, a rule generation number is stored with inodes for files and directories and used to determine whether the files and directories have been reported to the file system analytics software that collects and reports on file system properties based on a current set of rules. Accordingly, file operations that impact analytics properties and are concurrent with applying the current set of rules across the file system can be selectively reported based on the associated rule generation number. Additionally, concurrent file and directory movement can be handled using the rule generation number to avoid double counting of analytics property values. Thereby, this technology advantageously ensures correctness of file system analytics while facilitating more efficient analytics operations.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method implemented by a computing device in a data storage network and comprising:
   receiving a modification of a stored rule set that defines properties of objects stored in a file system associated with a storage volume hosted by one or more data storage devices in the data storage network;
   incrementing a stored first generation number for the storage volume in response to the received modification, wherein the incremented first generation number facilitates reporting of file system analytics across rule set modifications;
   for each node of a plurality of nodes corresponding to a first one of the objects encountered during a traversal of a directory tree data structure associated with the file system, propagating an analytics value up the directory tree data structure, when a comparison indicates a second generation number for the first one of the objects fails to match the incremented first generation number, wherein the analytics value is obtained by applying the modified stored rule set to a first one of the properties for the first one of the objects; and
   outputting analytics data for display via a display device after the traversal of the directory tree data structure and in response to a received analytics query, wherein the analytics data is based on the analytics value and correctness of the analytics data is ensured based on the comparison.

2. The method of claim 1, further comprising determining when a second one of the objects has been reported based on a comparison of a third generation number in an inode associated with the second one of the objects following receipt of a file operation during the traversal, wherein the file operation modifies a value for a second one of the properties for the second one of the objects.

3. The method of claim 2, further comprising performing the file operation on the second one of the objects without reporting the modification of the value to a parent directory of the second one of the objects, when the second one of the objects is unreported.

4. The method of claim 1, wherein a second one of the objects comprises a subdirectory and the method further comprises determining when to report the second one of the objects following receipt of a directory rename operation based on whether the traversal has completed for the second one of the objects and a third one of the objects and whether the second and third ones of the objects have been reported.

5. The method of claim 4, wherein the third one of the objects comprises a destination directory for the subdirectory, a fourth one of the objects comprises a source directory for the subdirectory, and the directory rename operation requires movement of the second one of the objects from the fourth one of the objects to the third one of the objects.

6. The method of claim 5, further comprising initiating another traversal of a portion of the directory tree data structure based on the second one of the objects, when the traversal has yet to encounter the second one of the objects and the third one of the objects has been reported.

7. A non-transitory machine readable medium having stored thereon instructions for managing file system analytics comprising machine executable code that, when executed by a machine in a data storage network, causes the machine to:
   modify a stored first generation number for a storage volume hosted by one or more data storage devices in the data storage network in response to a modification of a stored rule set that defines properties of objects in a file system associated with the storage volume;
   traverse a directory tree data structure associated with the file system, and for each of a plurality of nodes of the directory tree data structure encountered during the traversal:
      compare a second generation number for a first one of the objects to the modified first generation number to determine when the first one of the objects has been reported; and
      propagate one or more analytics values up the directory tree data structure, when the second generation number fails to match the modified first generation number, wherein the analytics values are generated based on an application of the modified rule set to one or more of the properties for the first one of the objects; and
   output analytics data for display via a display device after the traversal of the directory tree data structure and in response to a received query, wherein the analytics data is based on the analytics values and correctness of the analytics data is ensured based on the comparison.

8. The non-transitory machine readable medium of claim 7, wherein the machine executable code, when executed by the machine, further causes the machine to determine when a second one of the objects has been reported based on a comparison of a third generation number in an inode associated with the second one of the objects following receipt of a file operation during the traversal, wherein the file operation modifies a value for at least one of the properties for the second one of the objects.

9. The non-transitory machine readable medium of claim 8, wherein the machine executable code, when executed by the machine, further causes the machine to perform the file operation on the second one of the objects without reporting the modification of the value to a parent directory of the second one of the objects, when the determination indicates the second one of the objects is unreported.

10. The non-transitory machine readable medium of claim 7, wherein a second one of the objects comprises a subdirectory and the machine executable code, when executed by the machine, further causes the machine to determine when to report the second one of the objects following receipt of a directory rename operation based on whether the traversal has completed for the second one of the objects and a third one of the objects and whether the second and third ones of the objects have been reported.

11. The non-transitory machine readable medium of claim 10, wherein the third one of the objects comprises a destination directory for the subdirectory, a fourth one of the objects comprises a source directory for the subdirectory, and the directory rename operation requires movement of the second one of the objects from the fourth one of the objects to the third one of the objects.

12. The non-transitory machine readable medium of claim 11, wherein the machine executable code, when executed by the machine, further causes the machine to initiate another traversal of a portion of the directory tree data structure based on the second one of the objects, when the traversal has yet to encounter the second one of the objects and the third one of the objects has been reported.

13. The non-transitory machine readable medium of claim 11, wherein the directory tree data structure comprises parent nodes corresponding to directories of the file system and child nodes corresponding to the objects and the first one of the objects is referenced by one of the child nodes encountered in a current traversal of the directory tree data structure.

14. A computing device, comprising:
   a memory containing machine readable media comprising machine executable code having stored thereon instructions; and
   a processor coupled to the memory and configured to execute the machine executable code to cause the processor to:
      assign a first generation number to an obtained rule set for a storage volume hosted by one or more data storage devices in a data storage network, wherein the rule set defines properties of objects stored in a file system associated with the storage volume;
      traverse a directory tree data structure associated with the file system and for each node of the directory tree data structure encountered during the traversal:
         compare a second generation number for a first one of the objects corresponding to the node to the first generation number, and when the second generation number fails to match the first generation number:
            apply one or more rules of the rule set to one or more of the properties for the first one of the objects to obtain one or more analytics values; and
            propagate the one or more analytics values up the directory tree data structure;
      receive an analytics query; and
      output analytics data for display via a display device after the traversal of the directory tree data structure is complete, wherein the analytics data is based on the one or more analytics values.

15. The computing device of claim 14, wherein the processor is further configured to execute the machine executable code to further cause the processor to determine when a second one of the objects has been reported based on a comparison of a third generation number in an inode associated with the second one of the objects following receipt of a file operation during the traversal, wherein the file operation modifies a value for at least one of the properties for the second one of the objects.

16. The computing device of claim 15, wherein the processor is further configured to execute the machine executable code to further cause the processor to perform the file operation on the second one of the objects without reporting the modification of the value to a parent directory of the second one of the objects, when the determination indicates the second one of the objects is unreported.

17. The computing device of claim 14, wherein a second one of the objects comprises a subdirectory and the processor is further configured to execute the machine executable code to further cause the processor to determine whether to report second one of the objects following receipt of a directory rename operation based on whether the traversal has completed for the second one of the objects and a third one of the objects and whether the second and third ones of the objects have been reported.

18. The computing device of claim 17, wherein the third one of the objects comprises a destination directory for the subdirectory, a fourth one of the objects comprises a source directory for the subdirectory, and the directory rename operation requires movement of the second one of the objects from the fourth one of the objects to the third one of the objects.

19. The computing device of claim 18, wherein the processor is further configured to execute the machine executable code to further cause the processor to initiate another traversal of a portion of the directory tree data structure based on the second one of the objects, when the traversal has yet to encounter the second one of the objects and the third one of the objects has been reported.

20. The computing device of claim 13, wherein the directory tree data structure comprises parent nodes corresponding to directories of the file system and child nodes corresponding to the objects and the first one of the objects is referenced by one of the child nodes encountered in a current traversal of the directory tree data structure.

* * * * *